United States Patent
Merchant

(10) Patent No.: US 7,959,179 B1
(45) Date of Patent: Jun. 14, 2011

(54) TOW BAR HAVING LUNETTE RING HEAD AND FISHTAIL-REDUCING CAMMED EQUIANGULARLY-ORIENTED TOW BAR LEGS

(75) Inventor: David Merchant, Lincoln, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 163 days.

(21) Appl. No.: 12/454,974

(22) Filed: May 27, 2009

(51) Int. Cl.
*B60D 1/14* (2006.01)

(52) U.S. Cl. ..................................... 280/493; 280/491.4

(58) Field of Classification Search ............... 280/478.1, 280/491.1, 456.1, 482, 493, 491.4, 454, 455.1, 280/462, 494, 515, 488, 489, 491.3, 491.5
See application file for complete search history.

(56) References Cited

U.S. PATENT DOCUMENTS

| | | | |
|---|---|---|---|
| 3,083,040 A | 3/1963 | Hayman et al. | |
| 3,492,022 A | 1/1970 | Hansen | |
| 4,640,523 A | 2/1987 | Wolmarans | |
| 4,861,061 A | 8/1989 | Frantz | |
| 5,516,140 A | 5/1996 | Hinte | |
| 5,873,595 A | 2/1999 | Hinte | |
| 5,957,477 A | 9/1999 | Ensz et al. | |
| 6,854,756 B1 | 2/2005 | Solberg | |
| 7,029,021 B2 | 4/2006 | Klar | |
| 7,390,007 B2 | 6/2008 | Helms et al. | |
| 2004/0190977 A1 | 9/2004 | Matern | |
| 2005/0141953 A1 | 6/2005 | Chuan | |
| 2006/0249926 A1 | 11/2006 | Smith | |
| 2007/0001425 A1* | 1/2007 | Helms et al. | 280/456.1 |

* cited by examiner

*Primary Examiner* — Tony H. Winner
(74) *Attorney, Agent, or Firm* — Donald R. Schoonover

(57) ABSTRACT

A tow bar having a towing hitch member with a pintle hitch and secured to a towing vehicle; a towed hitch member secured to a towed vehicle; a head member with a lunette ring releasably connectable to the pintle hitch; first and second tow bar legs with proximal ends pivotally connected to, and extending rearwardly from, the head member; towed connector elements releasably connecting distal ends of the first and second tow bar legs to the towed hitch member; and an equalizer member structured to maintain the first and second tow bar legs at equiangular orientations relative to the head member.

4 Claims, 2 Drawing Sheets

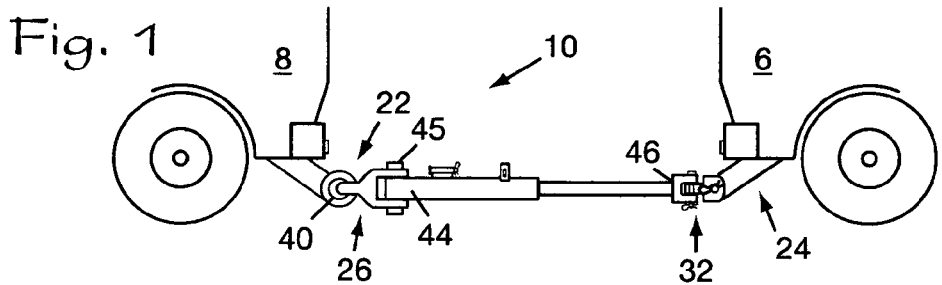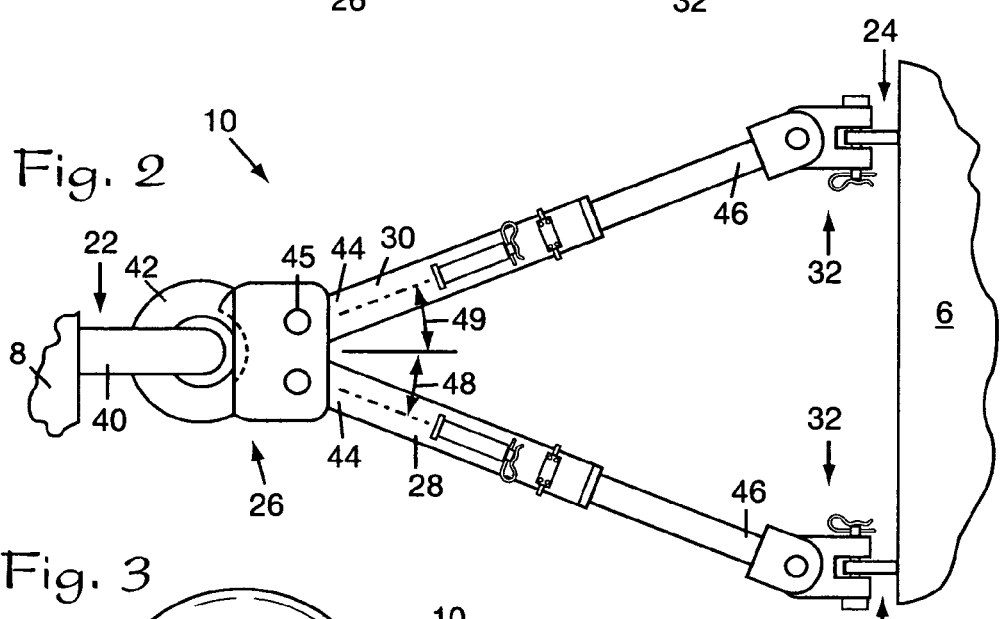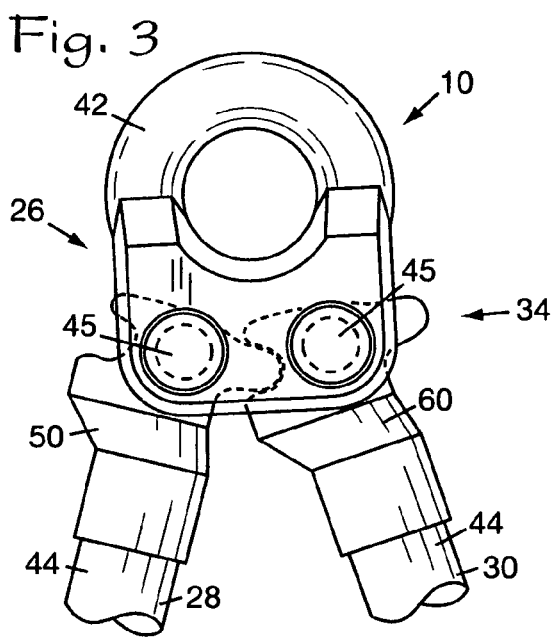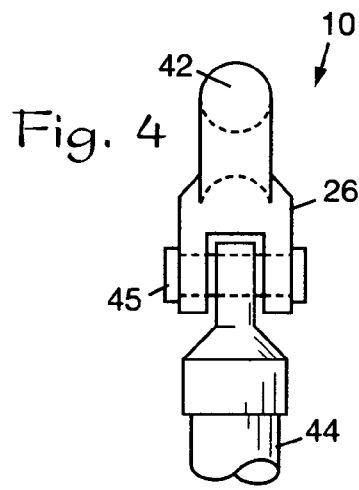

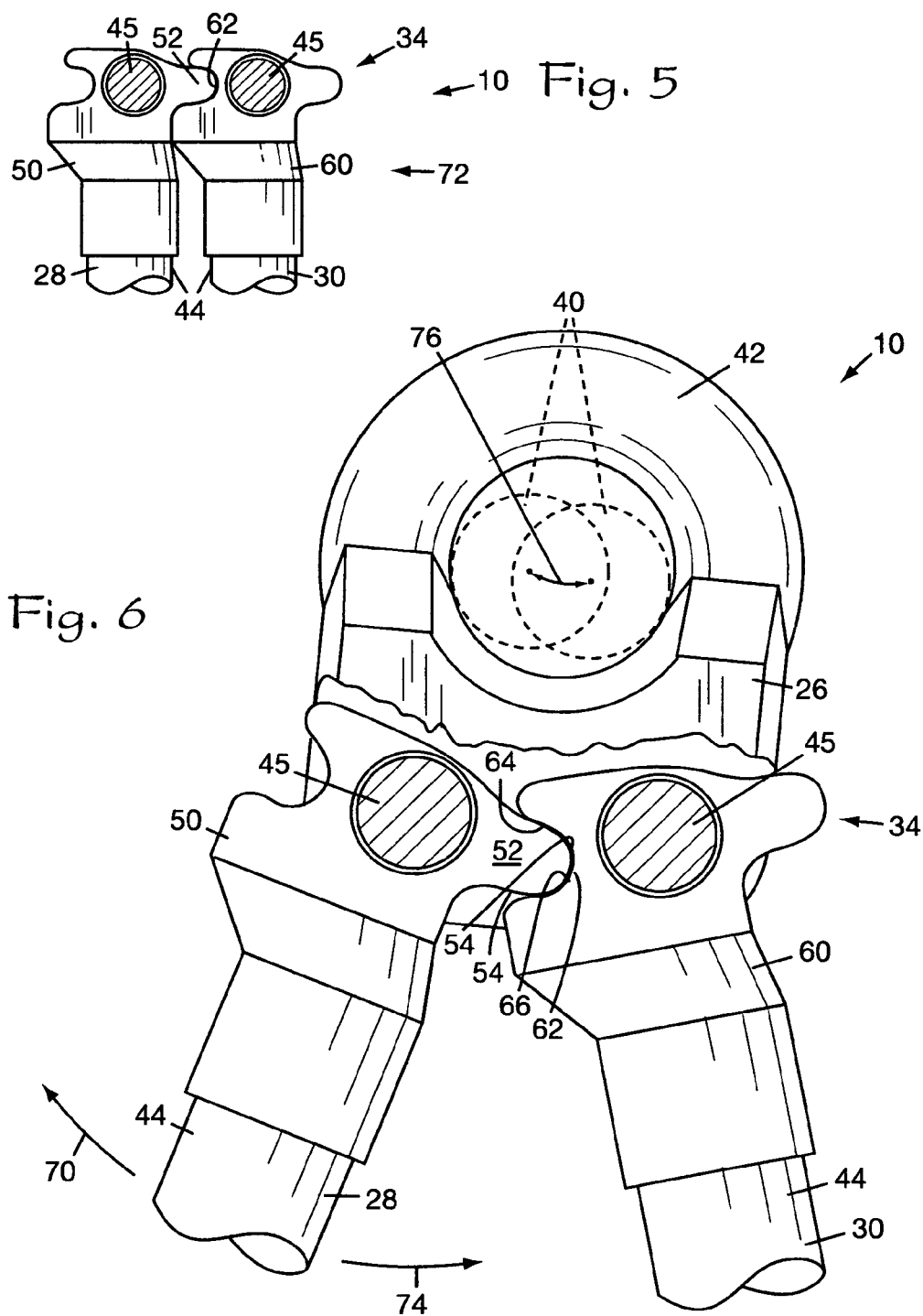

TOW BAR HAVING LUNETTE RING HEAD AND FISHTAIL-REDUCING CAMMED EQUIANGULARLY-ORIENTED TOW BAR LEGS

BACKGROUND OF THE INVENTION

1. Field of the Invention

The present invention relates to tow bars for connecting a vehicle to be towed to a towing vehicle and, more particularly without limitation, to tow bars for connecting to a pintle hitch of a towing vehicle.

2. Description of the Related Art

A tow bar is generally used for connecting a towing hitch arrangement of a vehicle to be towed, sometimes referred to herein as a towed vehicle, to a towing hitch arrangement of a towing vehicle. For applications wherein the towed vehicle will be towed at speeds other than very slow speeds, such as when a large airliner is being backed away from a terminal for example, the tow bar, which connects the front end of the towed vehicle to the rear end of the towing vehicle, generally has two tow bar legs, the front end of each tow bar leg separately and pivotally connected to a body portion of the tow bar. In use, the front ends of the tow bar legs form the apex of an isosceles triangle and the rear ends of the tow bar legs are spaced apart to form the sides of the isosceles triangle. The triangular configuration is intended to cause the towed vehicle to closely track the towing vehicle, both along straightaways and around corners.

Tow bars must generally be designed to accommodate variations in attitude that inherently occur between the towing and towed vehicles, which variations are constantly and continuously changing during use. One such variation in attitude between the vehicles occurs when the instantaneous elevation of the towing vehicle differs from the instantaneous elevation of the towed vehicle. A related variation in attitude between the vehicles occurs when the instantaneous ascent/descent orientation of the towing vehicle differs from the instantaneous ascent/descent orientation of the towed vehicle. Both of these related variations in attitude can be accommodated by apparatus designed to accommodate relative rotations between the towing and towed vehicles about a transverse, horizontal axis, sometimes referred to as the "pitch" axis.

Another such variation in attitude between the vehicles occurs when the instantaneous horizontal direction in which the towing vehicle is traveling differs from the instantaneous horizontal direction in which the towed vehicle is traveling, such as when the towed vehicle is being pulled around an unbanked corner for example. This situation, sometimes referred to as "yaw", can be accommodated by apparatus designed to accommodate relative rotations between the towing and towed vehicles about a vertical axis.

Finally, another such variation in attitude between the vehicles occurs when the instantaneous sidewise tilt of the towing vehicle differs from the instantaneous sidewise tilt of the towed vehicle, such as the rocking motion which occurs when traversing uneven or rough pavement for example. This situation, sometimes referred to as "roll", can be accommodated by tow bar apparatus designed to accommodate relative rotations between the towing and towed vehicles about a longitudinal, horizontal axis.

During actual towing procedures, all combinations of the pitch, yaw and roll are continuously occurring and constantly changing. Prior art is replete with tow bar designs that have been developed in an attempt to accommodate these phenomena, some of those designs being more successful than others. For example, a ball hitch/ball hitch receiver combination securing a tow bar to a towing vehicle can theoretically accommodate all three of the pitch, yaw and roll criteria. Although the ability of such a combination to accommodate yaw is acceptable and the pivot axes therefor are well-defined, unfortunately the ability of such a hitch combination to accommodate either pitch or roll is extremely limited. Failure to strictly observe such pitch and roll limitations can cause disastrous and even fatal results.

Another commonly used hitch arrangement involves using a conventional receiver hitch in combination with a conventional square hitch tube. Although such an arrangement may be convenient for connecting a tow bar to a towing vehicle, this type of connection by itself provides absolutely no ability to accommodate any one of the three pitch, yaw or roll criteria. As a result, the tow bar and/or connections between the tow bar and the towed vehicle must be relied upon to provide a solution for minimizing the potentially detrimental effects of pitch, yaw and roll.

Another arrangement that is useful, particularly when towing massive vehicles, such as heavy military equipment for example, comprises a pintle hitch of a towing vehicle connected to a lunette ring hitch. Such a pintle/lunette ring hitch arrangement substantially enhances the ability to accommodate pitch and yaw phenomena between the towing and towed vehicles. Unfortunately, this type of hitch arrangement inherently produces some play, although minimal, between the pintle and the lunette ring. As a result, neither the pitch axis nor the yaw axis are well-defined because the pintle continually shifts back and forth, and forwardly and rearwardly in the opening through the lunette ring. In so doing, the magnitude of the applied towing force is constantly differing between the two tow bar legs causing the connections to pivotally respond thereto which, in turn, causes the towed vehicle to wander or fishtail to a greater extent behind the towing vehicle than it would if the rotational axes between the pintle and lunette ring were well-defined. Such tendency to fishtail exacerbates wear and tear on the towing vehicle, on the towed vehicle, on the pintle, on the lunette ring, and on the pivotal connections between the tow bar legs and the tow bar body, which also visits greater stress on the operator of the towing vehicle while having to contend with such undesirable added activity between the towing and towed vehicles.

What is needed is a tow bar that counteracts the tendency of a towed vehicle to wander or fishtail which tendency operatively arises from the inherent play between a pintle and lunette ring hitch connection between towing and towed vehicles, such as a tow bar having tow bar legs that are operably maintained at an equiangular orientation relative to the body of the tow bar.

SUMMARY OF THE INVENTION

The improvements of the present invention for a tow bar for connecting a towed vehicle to a towing vehicle include a towing hitch member having a pintle hitch secured to a towing vehicle; a head member including a lunette ring structured to releasably connect the head member to the pintle hitch of the towing hitch member; first and second tow bar legs having proximal ends pivotally connected to the head member and distal ends extending rearwardly from the head member; towed connector elements secured to the distal ends of the tow bar legs and structured to releasably connect the tow bar legs to a towed hitch member secured to the towed vehicle; and an equalizer member structured to maintain the tow bar legs oriented equiangularly relative to the head member.

The equalizer member includes a first cam portion secured to the proximal end of the first tow bar leg wherein the first cam portion has a protrusion with a fore outer surface and an aft outer surface, and a second cam portion secured to the proximal end of the second tow bar leg wherein the second cam portion has a recess with a fore inner surface and an aft inner surface. The protrusion and recess are structured wherein as the first tow bar leg is angularly displaced away from the second tow bar leg, the aft outer surface of the protrusion of the first cam portion bears against and slides along the aft inner surface of the recess of the second cam portion and, in response thereto, the fore inner surface of the recess of the second cam portion slides along the fore outer surface of the recess of the first cam portion to thereby maintain the first and second tow bar legs at equiangular orientations relative to the head member; and as the first tow bar leg is angularly displaced toward a stored configuration alongside the second tow bar leg, the fore outer surface of the protrusion of the first cam portion bears against and slides along the fore inner surface of the recess of the second cam portion and, in response thereto, the aft inner surface of the recess of the second cam portion slides along the aft outer surface of the protrusion of the first cam portion to thereby maintain the first and second tow bar legs at equiangular orientations relative to the head member.

PRINCIPAL OBJECTS AND ADVANTAGES OF THE INVENTION

The principal objects and advantages of the present invention include: providing a tow bar structured to counteract the tendency of a towed vehicle to wander or fishtail which tendency operatively arises from the inherent play between a pintle and lunette ring hitch connection between towing and towed vehicles; providing such a tow bar that operably maintains tow bar legs thereof at equiangular orientations relative to the body of the tow bar; and generally providing such a tow bar that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example and without limitation, certain embodiments of this invention.

BRIEF DESCRIPTION OF THE DRAWING FIGURES

FIG. 1 is a side elevational view of a tow bar in use, the tow bar having a lunette ring head member and fishtail-reducing cammed, equiangularly-oriented tow bar legs in accordance with the present invention.

FIG. 2 is an enlarged top plan view of the tow bar.

FIG. 3 is a further enlarged and fragmentary top plan view of the lunette ring head member of the tow bar and first and second cam portions of an equalizing member thereof partially shown in dashed lines.

FIG. 4 is similar to FIG. 3 but shows a side elevational view of the head member and first and second cam portions of the equalizing member of the tow bar.

FIG. 5 is similar to FIG. 3 but shows a top plan view of the first and second cam portions of the equalizing member of the tow bar pivoted to a stored configuration.

FIG. 6 is a still further enlarged, fragmentary and partially cross-sectional top plan view of the tow bar with portions cut away to reveal details thereof in accordance with the present invention.

DETAILED DESCRIPTION OF THE INVENTION

As required, embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

A tow bar is used to connect a towed vehicle 6 to a towing vehicle 8. The reference numeral 10 generally refers to a tow bar in accordance with the present invention, as shown in FIGS. 1 through 6. The tow bar 10 includes a towing hitch member 22, a towed hitch member 24, a head member 26, first and second tow bar legs 28, 30, towed connector elements 32, and an equalizer member 34.

The towing hitch member 22 is secured to the towing vehicle 8 and includes a pintle hitch 40. The towed hitch member 24 is secured to the towed vehicle 6.

The head member 26 includes a lunette ring 42 structured to releasably connect the head member 26 to the pintle hitch 40 of the towing hitch member 22.

Each of the first and second tow bar legs 28, 30 includes a proximal end 44 pivotally connected to the head member 26 by pivot pins 45, and a distal end 46 extending rearwardly from the head member 26.

The towed connector elements 32 are secured to respective distal ends 46 of the first and second tow bar legs 28, 30. The towed connector element 32 is structured to releasably connect the towed connector elements 32 to the towed hitch member 24.

The equalizer member 34 is structured to maintain the angle 48 of the first tow bar leg 28 relative to the head member 26 equal to the angle 49 of the second tow bar leg 30 relative to the head member 26, as indicated in FIG. 2. In other words, the equalizer member 34 is structured to maintain the first and second tow bar legs 28, 30 oriented equiangularly relative to the head member 26. For example, the equalizer member 34 may include a first cam portion 50 secured to the proximal end 44 of the first tow bar leg 28, wherein the first cam portion 50 includes a protrusion 52 having a fore outer surface 54 and an aft outer surface 56.

Accordingly, the equalizer member 34 may also include a cooperatively interacting second cam portion 60 secured to the proximal end 44 of the second tow bar leg 30, wherein the second cam portion 60 includes a recess 62 having a fore inner surface 64 and an aft inner surface 66. The protrusion 52 and recess 62 are structured wherein, as the first tow bar leg 28 is angularly displaced away from the second tow bar leg 30, as indicated by the arrow designated by numeral 70 in FIG. 6, the aft outer surface 56 of the protrusion 52 of the first cam portion 50 bears against and slides along the aft inner surface 66 of the second cam portion 60 and, in response thereto, the fore inner surface 64 of the recess 62 of the second cam portion 60 slides along the fore outer surface 54 of the first cam portion 50 to thereby maintain the first and second tow bar legs 28, 30 at an equiangular orientation relative to the head member 26.

Similarly, as the first tow bar leg 28 is angularly displaced toward the second tow bar leg 30, as indicated by the arrow designated by numeral 74 in FIG. 6 and to a stored configuration 72 as indicated in FIG. 5, the fore outer surface 54 of the protrusion 52 of the first cam portion 50 bears against and slides along the fore inner surface 64 of the recess 62 of the second cam portion 60 and, in response thereto, the aft inner surface 66 of the recess 62 of the second cam portion 60 slides along the aft outer surface 56 of the protrusion 52 of the first cam portion 50 to thereby maintain the first and second tow bar legs 28, 30 at the equiangular orientation relative to the head member 26.

Simply stated, the first and second cam portions 50, 60 of the equalizer member 34 are profiled and dimensioned, and the spacing between the axes of the pivot pins 45 which pivotally connect the first and second cam portions 50, 60 to the head member 26, are such that the protrusion 52 is captured within the recess 62. The equalizer member 34 ensures that the first and second tow bar legs 28, 30 are maintained equiangularly-oriented relative to the head member 26, thereby ensuring that towing load is distributed equally to both tow bar legs 28, 30 and that turning angles are the same whether turning to the left or to the right. It should be noted that although the angular orientations of the first and second tow bar legs 28, 30 are equal, they are equal and opposite to each other.

Preferably, the first and second cam portions 50, 60 are substantially identical to each other in order to reduce manufacturing costs.

Based on the teachings herein, it would be obvious to persons skilled in the relevant art that the equalizer member 34, by maintaining the tow bar legs 28, 30 at an equiangular orientation relative to the head member 26, eliminates pivoting of the tow bar legs 28, 30 relative to the head member 26 which would otherwise occur as the pintle hitch 40 shifts back and forth within the lunette ring 42, as indicated by the dashed lines and arrow designated by numeral 76 in FIG. 6.

It is foreseen that a pair of mating cog-type gears could be utilized in lieu of the first and second cam portions 50, 60. An embodiment utilizing the first and second cam portions 50, 60 as described herein is preferred as the abutting surfaces of the protrusion 52 and recess 62 present larger bearing surfaces which are continuous and oriented substantially transversely to the equiangular-maintaining forces applied thereagainst, thereby reducing wear and tear thereof, than would be realized with a cog-type gear arrangement.

In an application of the present invention 10, the distal ends 46 of the tow bar legs 28, 30 are spread apart and the towed connector elements 32 are connected to the towed hitch member 24 of the towed vehicle 6. The pintle hitch 40 of the towing hitch member 22 of the towing vehicle 8 is connected to the lunette ring 42 of the head member 26. The tow bar 10 may also include other features to simplify connecting the tow bar 10 to the towing and towed vehicles, such as the locking element(s) and orthogonally-articulated towed-vehicle connectors as described in application Ser. No. 12/386,203, the disclosure of which is incorporated herein by reference.

It is to be understood that while certain forms of the present invention have been illustrated and described herein, it is not to be limited to the specific forms or arrangement of parts as described and shown.

What is claimed and desired to be covered by Letters Patent is as follows:

1. A tow bar for connecting a towed vehicle to a towing vehicle, the tow bar comprising:
    (a) a towing hitch member secured to a towing vehicle;
    (b) a towed hitch member secured to a towed vehicle;
    (c) a head member including a towing connector element structured to releasably connect the head member to the towing hitch member;
    (d) first and second tow bar legs, each having a proximal end pivotally connected to the head member and a distal end extending rearwardly from the head member;
    (e) towed connector elements secured to the distal ends of the first and second tow bar legs, the towed connector elements being structured to releasably connect the first and second tow bar legs to the towed hitch member; and
    (f) an equalizer member structured to maintain the first and second tow bar legs oriented equiangularly relative to the head member, the equalizer member including:
        (1) a first cam portion secured to the proximal end of the first tow bar leg, the first cam portion including a protrusion having a fore outer surface and an aft outer surface; and
        (2) a second cam portion secured to the proximal end of the second tow bar leg, the second cam portion including a recess having a fore inner surface and an aft inner surface, the second cam portion being substantially identical to the first cam portion;
        (3) the protrusion and recess being structured wherein as the first tow bar leg is angularly displaced away from the second tow bar leg, the aft outer surface of the protrusion of the first cam portion bears against and slides along the aft inner surface of the recess of the second cam portion while the fore inner surface of the recess of the second cam portion bears against and slides along the fore outer surface of the protrusion of the first cam portion.

2. A tow bar as defined in claim 1, wherein the towing hitch member includes a pintle hitch and the towing connector element includes a lunette ring.

3. A tow bar for connecting a towed vehicle to a towing vehicle, the tow bar comprising:
    (a) a towing hitch member including a pintle hitch, the towing hitch member being secured to a towing vehicle;
    (b) a towed hitch member secured to a towed vehicle;
    (c) a head member including a lunette ring structured to releasably connect the head member to the pintle hitch of the towing hitch member;
    (d) first and second tow bar legs, each having a proximal end pivotally connected to the head member and a distal end extending rearwardly from the head member;
    (e) towed connector elements secured to the distal ends of the first and second tow bar legs, the towed connector elements being structured to releasably connect the first and second tow bar legs to the towed hitch member; and
    (f) an equalizer member structured to maintain the first and second tow bar legs oriented equiangularly relative to the head member, the equalizer member including:
        (1) a first cam portion secured to the proximal end of the first tow bar leg, the first cam portion having a protrusion with a fore outer surface and an aft outer surface; and
        (2) a second cam portion secured to the proximal end of the second tow bar leg, the second cam portion having a recess with a fore inner surface and an aft inner surface, the second cam portion being substantially identical to the first cam portion;
        (3) the protrusion and recess being structured wherein:
            (A) as the first tow bar leg is angularly displaced away from the second tow bar leg, the aft outer surface of the protrusion of the first cam portion bears against and slides along the aft inner surface of the recess of the second cam portion and, in response thereto, the fore inner surface of the recess of the second cam portion slides along the fore outer surface of the protrusion of the first cam portion to thereby maintain the first and second tow bar legs at equiangular orientations relative to the head member, and (B) as the first tow bar leg is angularly displaced toward the second tow bar leg, the fore outer surface of the protrusion of the first cam portion bears against and slides along the fore inner surface of the recess of the second cam portion and, in response thereto, the aft inner surface of the recess of the second cam portion slides along the aft outer surface of the protrusion of the first cam portion to thereby maintain the first and second tow bar legs at equiangular orientations relative to the head member.

4. In a tow bar for connecting a towed vehicle to a towing vehicle wherein the tow bar includes a head member and first and second tow bar legs having proximal ends thereof pivotally connected to and extending rearwardly from the head member, the improvement comprising:

an equalizer member having a first cam portion connected to the proximal end of the first tow bar leg and a second cam portion connected to the proximal end of the second tow bar leg wherein the second cam portion being substantially identical to the first cam portion, the first cam portion including a protrusion having a fore outer surface and an aft outer surface and the second cam portion including a recess having a fore inner surface and an aft inner surface, the protrusion and recess being structured wherein as the first tow bar leg is angularly displaced away from the second tow bar leg, the aft outer surface of the protrusion of the first cam portion continuously bears against and slides along the aft inner surface of the recess of the second cam portion while the fore inner surface of the recess of the second cam portion continuously bears against and slides along the fore outer surface of the protrusion of the first cam portion to thereby maintain the first and second tow bar legs at equiangular orientations relative to the head member with the abutting surfaces between the protrusion and recess being relatively large, continuous and substantially transversely oriented.

* * * * *